(12) United States Patent
Loccufier et al.

(10) Patent No.: US 8,063,115 B2
(45) Date of Patent: Nov. 22, 2011

(54) RADIATION CURABLE COMPOSITIONS

(75) Inventors: Johan Loccufier, Zwijnaarde (BE); Roland Claes, Dendermonde (BE)

(73) Assignee: Agfa Graphics NV, Mortsel (BE)

( * ) Notice: Subject to any disclaimer, the term of this patent is extended or adjusted under 35 U.S.C. 154(b) by 295 days.

(21) Appl. No.: 12/443,958

(22) PCT Filed: Nov. 19, 2007

(86) PCT No.: PCT/EP2007/062501
§ 371 (c)(1),
(2), (4) Date: Apr. 1, 2009

(87) PCT Pub. No.: WO2008/061957
PCT Pub. Date: May 29, 2008

(65) Prior Publication Data
US 2009/0326091 A1    Dec. 31, 2009

Related U.S. Application Data

(60) Provisional application No. 60/867,257, filed on Nov. 27, 2006.

(30) Foreign Application Priority Data

Nov. 23, 2006  (EP) ..................... 06124637

(51) Int. Cl.
*C08F 2/50* (2006.01)
*C08F 2/42* (2006.01)
*C08J 3/28* (2006.01)

(52) U.S. Cl. .................. 522/28; 522/7; 522/8; 522/14; 522/30; 522/39; 522/57; 522/63; 522/65; 522/113; 522/114; 522/150; 522/908; 523/300

(58) Field of Classification Search .............. 522/7, 8, 522/14, 28, 30, 39, 57, 63, 65, 113, 114, 522/150, 908; 523/300
See application file for complete search history.

(56) References Cited

U.S. PATENT DOCUMENTS

| 4,289,844 | A | * | 9/1981 | Specht et al. ............ 430/281.1 |
| 6,114,404 | A | | 9/2000 | Deeken et al. |
| 6,265,458 | B1 | | 7/2001 | Nohr et al. |
| 6,479,706 | B1 | | 11/2002 | Santobianco et al. |
| 7,851,029 | B2 | * | 12/2010 | Romagnano et al. ......... 427/508 |
| 2003/0078313 | A1 | | 4/2003 | Santobianco et al. |
| 2008/0213502 | A1 | * | 9/2008 | Romagnano et al. ......... 427/519 |
| 2010/0304149 | A1 | * | 12/2010 | Loccufier et al. ............ 428/412 |

FOREIGN PATENT DOCUMENTS

| WO | 97/31071 A1 | 8/1997 |
| WO | 00/18750 A2 | 4/2000 |
| WO | 03/029365 A1 | 4/2003 |
| WO | 2004/046260 A2 | 6/2004 |

OTHER PUBLICATIONS

International Search Report (Feb. 4, 2008).

* cited by examiner

*Primary Examiner* — Sanza McClendon
(74) *Attorney, Agent, or Firm* — Leydig, Voit & Mayer, Ltd.

(57) ABSTRACT

A radiation curable composition comprising a curable compound, a photo-initiator and a co-initiator, wherein said co-initiator has a structure according to Formula I A-L-B    Formula I wherein
A represents a structural moiety comprising an aromatic tertiary amine;
B represents a structural moiety comprising at least one aliphatic tertiary amine;
L represents a divalent linking group positioning the nitrogen atom of the aromatic amine of the structural moiety A and the nitrogen of at least one aliphatic amine of the structural moiety B in a 1-3 to 1-23 position;
with the proviso that at least one aromatic and at least one aliphatic amine each have at least one alfa-hydrogen.

28 Claims, No Drawings

RADIATION CURABLE COMPOSITIONS

RELATED APPLICATIONS

This application is the U.S. National Phase of International Application No. PCT/EP2007/062501, filed Nov. 19, 2007, which claims priority to U.S. Provisional Application No. 60/867,257, filed Nov. 27, 2006, and European Patent Application No. 06124637.7, filed Nov. 23, 2006, each application being incorporated herein by reference.

FIELD OF THE INVENTION

The present invention relates to radiation curable compositions comprising a new type of co-initiator. The new co-initiator can be used in radiation curable compositions such as varnishes, lacquers, coating compositions and printing inks, e.g. radiation curable inkjet inks.

BACKGROUND OF THE INVENTION

A radiation curable composition, e.g. a radiation curable inkjet ink, typically comprises a photo-initiator. Upon exposure of said composition, the photo-initiator initiates the curing, i.e. the polymerization, of said composition.

Free radical photo-initiators can be classified as Norrish Type I or Norrish Type II photo-initiators. A Type I photo-initiator undergoes photo-cleavage to yield free radicals while a Type II photo-initiator produces free radicals through an abstraction process, in most cases hydrogen-abstraction. While a Type I photo-initiator produces free radicals through an unimolecular bond cleavage reaction, a Type II photo-initiator forms free radicals in the presence of a second molecule, the so called co-initiator also referred to as polymerization synergist.

A first problem for free-radical polymerization processes, especially with Type I photo-initiating systems, is the inhibition of the polymerization, i.e. decrease of the curing speed, by oxygen. Inhibition by oxygen results not only in a decreased overall curing speed, but can also result in an inhomogeneous curing, e.g. poor surface curing resulting in tacky surfaces.

Amines are known in the art as co-initiators for Type II photo-initiators and to suppress oxygen inhibition of free radical polymerization processes. The role of amines in curing systems has been reviewed, for example by R. S. Davidson in "Radiation Curing in Polymer Science and Technology, Volume III", edited by J. P. Fouassier et al., Elsevier Applied Science, 1993, pages 153-176.

According to WO 02/46323 ethyl-4-dimethylaminobenzoate or an acryl amine may serve as oxygen scavengers in UV curable inks for printing on Printed Circuit Boards.

U.S. Pat. No. 3,963,771 and U.S. Pat. No. 4,045,416 disclose amine acrylates produced by the reaction of a polyacrylate ester, preferably a diacrylate ester, with an amine having at least one hydrogen attached to the nitrogen atom. Said amine acrylates provide a fast curing speed to radiation curable coating compositions.

In the radiation curable coating compositions of U.S. Pat. No. 5,777,024 and US 2004/0254293 (a) tertiary aliphatic amines, e.g. diethanol amine, (b) aromatic amines, e.g. ethyl-4-dimethylaminobenzoate, (c) (meth)acrylated amines and (d) amino-functional (meth)acrylate resin or oligomer blends may be used as co-initiators.

According to WO 06/041289 Type-II photo-initiators are used in combination with (a) a monomer tertiary amine compound, (b) an oligomer or polymer tertiary amine compound, (c) a polymerizable amino acrylate compound or (d) a polymerized amino acrylate compound or mixtures thereof, in radiation curable compositions suitable for use as coating layers in optical fibre technology.

WO 99/03930 discloses a radiation curable coating composition containing an aliphatic maleimide as photo-active component and a tertiary amine, said amine providing a higher curing speed to the composition. The tertiary amine may be aliphatic (e.g. triethyl-amine) or aromatic (e.g. ethyl-4-dimethylaminobenzoate).

A second problem, associated with co-initiators, e.g. amines, present in a radiation curable composition, may arise when unreacted co-initiator remains in the cured composition. Hydrogen transfer from an amine co-initiator to a Type II photo-initiator is rarely quantitative. The unreacted co-initiator remains mobile in the cured composition and may adversely affect the physical properties of the cured composition or may diffuse out of the cured composition. If the radiation curable composition is printed upon food packaging, extraction of the unreacted co-initiator, also referred to as "extractables", into the food may cause health risks.

In WO 03/091288 a new class of amine co-initiators, in combination with Type I and/or Type II photo-initiators, is disclosed, said amine co-initiators being trialkylamines having a total of 10 to about 36 carbon atoms, wherein at least one alkyl group has a chain length of at least 8 carbon atoms. According to WO 03/091288 said amine co-initiators, when used in combination with a Type II photo-initiator, provide less "extractables" after curing compared to conventional amines as e.g. N-methyl-N,N-diethanolamine.

WO 99/07746 discloses a radiation curable composition containing a radiation curable resin, a photo-initiator and an amine as co-initiator, characterized in that said amine is a compound containing at least one tertiary amino group and wherein at least one substituent of the tertiary amino group is an aliphatic chain containing at least one electron-withdrawing group. Said amine compound is preferably a branched, highly branched or star-shaped dendrimer comprising at least one tertiary amino group. Said co-initiators, in combination with Type II photo-initiators, provide a higher curing speed and less "extractables".

EP-A 1 616 922 discloses a radiation curable composition containing a radiation curable resin, a photo-initiator and a co-initiator characterized in that said co-initiator comprises a dendritic polymer core with at least one co-initiating functional group, e.g. aliphatic or aromatic amines, as an end group on the polymer core. The radiation curable compositions according to EP-A 1 616 922 are characterized by a high curing speed and a low amount of "extractables".

EP-A 1 147 094 discloses multi-functional reactive amine acrylates having a low viscosity, prepared by the reaction of multifunctional (meth)acrylates with cyclic secondary amines. These amine acrylates provide a good curing speed, a higher thermal stability and less "extractables" to radiation curable compositions.

OBJECTS OF THE INVENTION

It is an object of the present invention to provide a radiation curable composition comprising a new class of very effective co-initiators.

Another object of the present invention is to provide a radiation curable inkjet ink comprising a new class of very effective co-initiators.

It is also an object of the present invention to provide a radiation curable composition comprising a new class of co-initiators in combination with Norrish Type I and/or Norrish Type II initiators, said compositions having a high curing speed.

It is another object of the present invention to provide a radiation curable composition comprising a new class of co-initiators, said compositions having a low amount of extractables after curing, opening possibilities for inkjet printing on food packaging.

These and other objects of the present invention will become apparent form the description hereinafter.

SUMMARY OF THE INVENTION

Aliphatic and aromatic amines are well known co-initiators for Type II photo-initiators. It was found that combining an aromatic and at least one aliphatic tertiary amine into a single molecule results in a new class of co-initiators which, in combination with a type II photo-initiator, provides a high curing speed and a low amount of "extractables" to a radiation curable composition. Surprisingly, said new class of co-initiators also provides a high curing speed to a radiation curable composition in combination with a Type I photo-initiator.

The objects of the present invention are realized with a radiation curable composition comprising a curable compound, a photo-initiator and a co-initiator characterized in that said co-initiator has a structure according to Formula I A-L-B                                                               Formula I wherein
A represents a structural moiety comprising an aromatic tertiary amine;
B represents a structural moiety comprising at least one aliphatic tertiary amine;
L represents a divalent linking group positioning the nitrogen atom of the aromatic amine of the structural moiety A and the nitrogen of at least one aliphatic amine of the structural moiety B in a 1-3 to 1-23 position;
with the proviso that at least one aromatic and at least one aliphatic amine each have at least one alfa-hydrogen.

Preferred embodiments of the present invention are described herein.

DETAILED DESCRIPTION OF THE INVENTION

The radiation curable composition comprises at least three components: (i) a curable compound, (ii) a photo-initiator and (iii) a co-initiator. Said composition may further comprise one or more inhibitors, surfactants, colorants, dispersants or dispersion synergists. The radiation curable composition is preferably a radiation curable inkjet ink, more preferably an UV curable inkjet ink.

Co-Initiator

The co-initiator, also referred to as a polymerization synergist, according to the present invention has a structure according to Formula I A-L-B                                                               Formula I wherein
A represents a structural moiety comprising an aromatic tertiary amine;
B represents a structural moiety comprising at least one aliphatic tertiary amine;
L represents a divalent linking group positioning the nitrogen atom of the aromatic amine of the structural moiety A and the nitrogen of at least one aliphatic amine of the structural moiety B in a 1-3 to 1-23 position;
with the proviso that at least one aromatic and at least one aliphatic amine each have at least one alfa-hydrogen.

An aromatic tertiary amine means an amine wherein at least one substituent is an aromatic group, e.g. phenyl group, directly bound to the N-atom of the amine.

An aliphatic amine means an amine wherein all substituents are aliphatic groups directly bound to the N-atom of the amine.

The nitrogen atom of the aromatic amine of the structural moiety A and the nitrogen of at least one aliphatic amine of the structural moiety B are in a 1-3 position when the divalent linking group L comprises one atom.

The divalent linking group L comprises at least one carbon atom.

The divalent linking group L in Formula I positions the nitrogen atom of the aromatic amine of the structural moiety A and the nitrogen of at least one aliphatic amine of the structural moiety B in a 1-3 to 1-23 position, preferably in a 1-4 to 1-18 position, more preferably in a 1-4 to 1-15 position.

The structural moiety A may comprise one, two, three or more aromatic amines.

In a preferred embodiment the co-initiator has a structure according to Formula II,

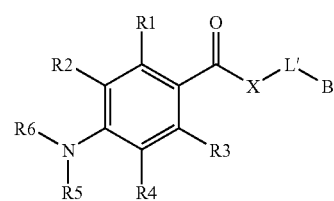

Formula II wherein
B has the same meaning as in Formula I;
L' represents a divalent linking group positioning the nitrogen atom of the aromatic amine and the nitrogen of at least one aliphatic amine of the structural moiety B in a 1-9 to 1-23 position;
X represents O, S or NR11;
R1, R2, R3 and R4 independently represent a hydrogen or a substituent;
R5 and R6 independently represent an optionally substituted alkyl group, an optionally substituted alkenyl group, an optionally substituted alkynyl group, an optionally substituted (hetero)aralkyl group, an optionally substituted cycloalkyl group or an optionally substituted (hetero)aryl group;
R11 represents a hydrogen, an optionally substituted alkyl group, an optionally substituted alkenyl group, an optionally substituted alkynyl group, an optionally substituted (hetero)aralkyl group, an optionally substituted cycloalkyl group or an optionally substituted (hetero) aryl group;
any two groups selected from R2, R4, R5 and R6 may represent the necessary atoms to form a ring;
R1 and R2, R3 and R4 may represent the necessary atoms to form a ring;
R1 or R3 may together with R11 represent the necessary atoms to form a ring;
R11 may represent the necessary atoms to form a ring with an atom of L';
R11 may represent the necessary atoms to form a ring with an atom of B;
an atom of L' may form a ring with an atom of B;
with the proviso that at least one aromatic and at least two aliphatic amine each have an alfa-hydrogen.

The divalent linking group L' comprises at least one carbon atom. The divalent linking group L' in Formula II positions the nitrogen atom of the aromatic amine and the nitrogen of at least one aliphatic amine of the structural moiety B in a 1-9 to 1-23 position, preferably in a 1-9 to 1-18 position, more preferably in a 1-9 to 1-15 position.

In a particularly preferred embodiment the structural moiety B of Formulae I and II comprises at least two, more preferably at least three, aliphatic tertiary amines. When more than one tertiary aliphatic amines are present in Formula I or II, preferably more than one tertiary aliphatic amine has at least one alfa-hydrogen.

In another preferred embodiment the co-initiator has a structure according to Formula III,

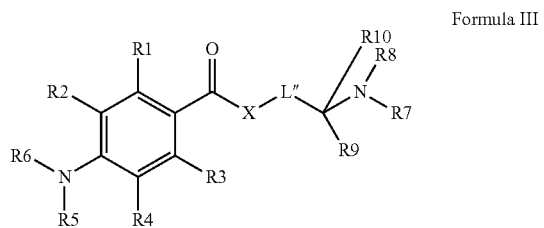

Formula III wherein
L" represents a divalent linking group positioning the nitrogen atom of the aromatic amine and the nitrogen of the aliphatic amine in a 1-10 to 1-23 position;
R1 to R6 have the same meaning as in Formula II;
R7 and R8 independently represent an optionally substituted alkyl group, an optionally substituted alkenyl group, an optionally substituted alkynyl group, an optionally substituted (hetero)aralkyl group or an optionally substituted cycloalkyl group;
X represents O, S or NR11 wherein R11 has the same meaning as in Formula II;
R9 and R10 independently represent a hydrogen, an optionally substituted alkyl group, an optionally substituted alkenyl group, an optionally substituted alkynyl group, an optionally substituted (hetero)aralkyl group, an optionally substituted cycloalkyl group or an optionally substituted (hetero)aryl group;
R6 and R5, R1 and R2, R3 and R4 may represent the necessary atoms to form a ring;
any combinations of two groups selected from R7 to R10 or from R5, R6, R2 and R4 may represent the necessary atoms to form a ring;
any of R7 to R10 may represent the necessary atoms to form a ring with one of the atoms of L";
R11 and R1, R11 and R3 may represent the necessary atoms to form a ring;
R11 may represent the necessary atoms to form a ring with one of the atoms of L";
R11 and any of R7 to R10 may represent the necessary atom to form a ring;
with the proviso that both the aromatic and aliphatic tertiary amine each have at least one alfa-hydrogen.

The divalent linking group L" comprises at least one carbon atom. The divalent linking group L" in Formula III positions the nitrogen atom of the aromatic amine and the nitrogen of the aliphatic amine in a 1-10 to 1-23 position, preferably in a 1-10 to 1-18 position, more preferably in a 1-10 to 1-15 position.

In another particularly preferred embodiment the co-initiator has a structure according to Formula IV,

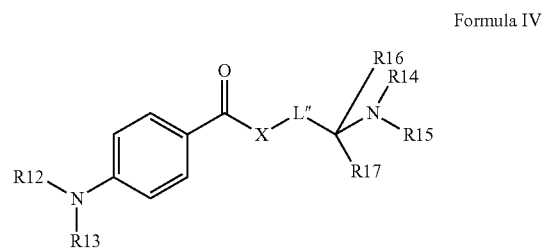

Formula IV wherein
L" has the same meaning as in Formula III;
R12, R13, R14 and R15 independently represent an optionally substituted alkyl group;
R16 and R17 independently represent a hydrogen or an optionally substituted alkyl group;
R12 and R13 may represent the necessary atoms to form a ring;
any two groups selected from R14 to R17 may represent the necessary atoms to form a ring;
any of R14 to R17 may represent the necessary atoms to form a ring with an atom of L";
with the proviso that both the aromatic and aliphatic tertiary amine each have at least one alfa-hydrogen.

The divalent linking group L" comprises at least one carbon atom. The divalent linking group L" in Formula IV positions the nitrogen atom of the aromatic amine and the nitrogen of the aliphatic amine in a 1-10 to 1-23 position, preferably in a 1-10 to 1-18 position, more preferably in a 1-10 to 1-15 position.

In another preferred embodiment the co-initiator has a structure according to Formula V

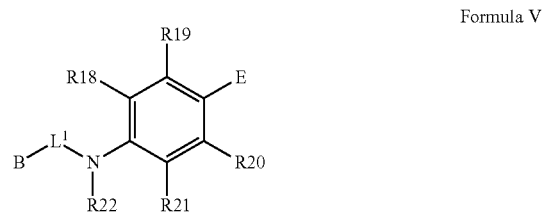

Formula V wherein
B represents a structural moiety comprising at least one aliphatic tertiary amine;
E represents an electron withdrawing group selected from the group consisting of an aldehyde, a ketone, an ester and an amide;
R18 to R21 independently represent a hydrogen or a substituent;
R22 represents an optionally substituted alkyl group, an optionally substituted alkenyl group, an optionally substituted alkynyl group, an optionally substituted (hetero)aralkyl group or an optionally substituted (hetero)aryl group;
$L^1$ represents a divalent linking group positioning the nitrogen atom of the aromatic amine and the nitrogen of at least one aliphatic amine of the structural moiety B in a 1-3 to 1-13 position;
R18 and R19 may represent the necessary atoms to form a 5 to 7 membered ring;
R21 and R20 may represent the necessary atoms to form a 5 to 7 membered ring;

R22 with any of R18 and R21 may represent the necessary atoms form a 5 to 7 membered ring;

any of R19 and R20 together with E may represent the necessary atoms to form a 5 to 7 membered ring;

R22 with an atom of B or $L^1$ may represent the necessary atoms to form a 5 to 7 membered ring;

any of R18, R19 and R21 may represent the necessary atoms to form a ring with an atom of B;

an atom of B may form a 5 to 7 membered ring with an atom of $L^1$;

with the proviso that at least one aromatic and at least one aliphatic amine each have at least one alfa-hydrogen.

The divalent linking group $L^1$ in Formula V comprises at least one carbon atom. The divalent linking group $L^1$ positions the nitrogen atom of the aromatic amine and the nitrogen of at least one aliphatic amine of the structural moiety B in a 1-3 to 1-13 position, preferably in a 1-3 to 1-10 position, more preferably in a 1-3 to 1-7 position.

An alkyl group referred to in Formulae II to V means all variants possible for each number of carbon atoms in the alkyl group i.e. for three carbon atoms: n-propyl and isopropyl; for four carbon atoms: n-butyl, isobutyl and tertiary butyl; for five carbon atoms: n-pentyl, 1,1-dimethyl-propyl, 2,2-dimethylpropyl and 2-methyl-butyl etc. Preferably, R5 and R6 in Formulae II, III and R12 and R13 in Formula IV represent an optionally substituted lower alkyl group. A lower alkyl group means an alkyl group as defined above comprising 1 up to 6 carbon atoms (C1 to C6 alkyl group). More preferably R5, R6, R12 and R13 represent an optionally substituted alkyl group with less than 4 carbon atoms (C1 to C4 alkyl group). Most preferably R5, R6, R12 and R13 represent a methyl group.

R1 to R4 in Formulae II and III and R18 to R21 in Formula V preferably represent an optionally substituted alkyl groups, more preferably an optionally substituted lower alkyl group, most preferably a hydrogen.

The substituents referred to in Formula II, III and V may be halogens, ethers, R—CO—NR'—, RCOO—, amines and tio-ethers wherein R represents an optionally substituted alkyl group, an optionally substituted alkenyl group, an optionally substituted alkynyl group, an optionally substituted (hetero)aralkyl group or an optionally substituted (hetero)aryl group and wherein R' represents an alkyl, aralkyl, alkenyl, alkynyl or aryl group.

A-L-B, according to Formula I, may represent a part of a repeating unit or the complete repeating unit of an oligomer or polymer. A-L-B, according to Formula I, may also represent an end group of a polymer. Preferably the co-initiator is not a polymeric co-initiator.

The co-initiator according to Formulae I to V preferably has a Molecular Weight of less than 1000, more preferably less than 850, most preferably less than 750, even more preferably less than 650.

Co-polymers consisting of repeating units comprising A and repeating units comprising B are not within the scope of the present invention.

Some examples of co-initiators of the present invention are given in Table 1.

TABLE 1

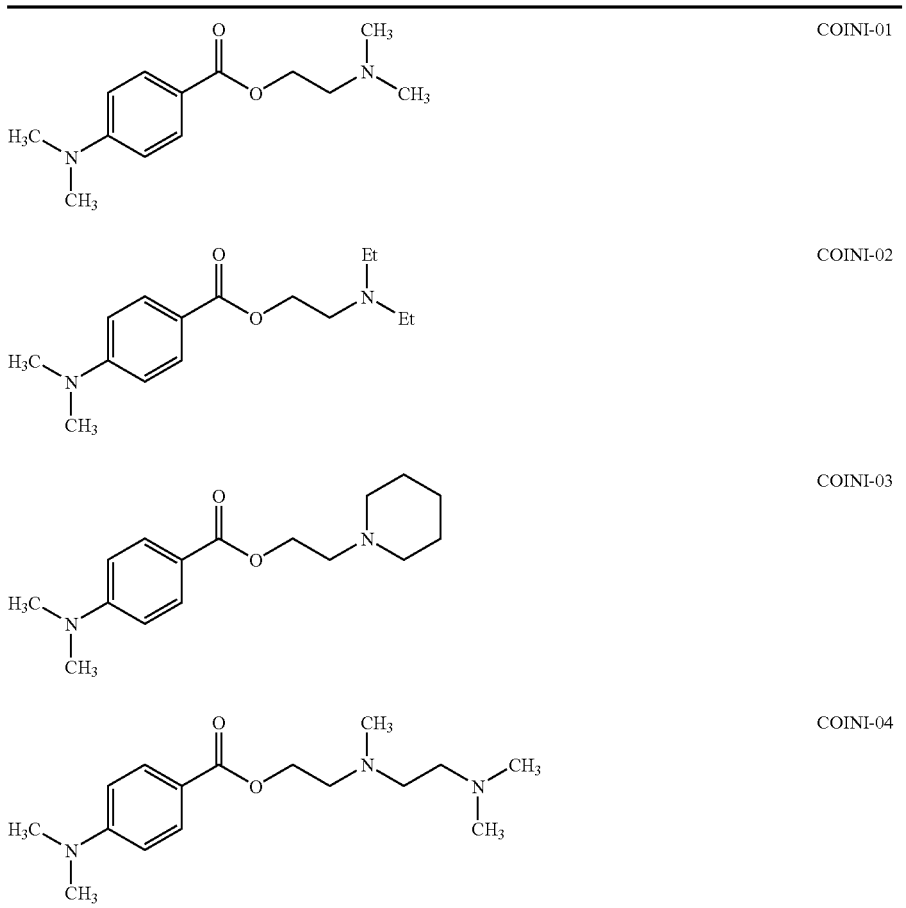

TABLE 1-continued
| | |
|---|---|
| 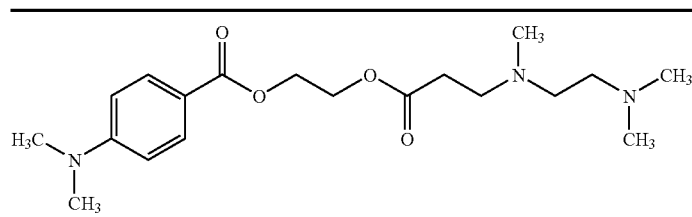 | COINI-05 |
| 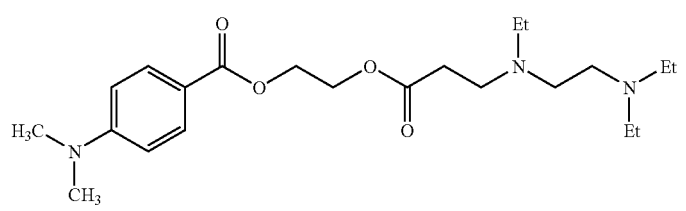 | COINI-06 |
| 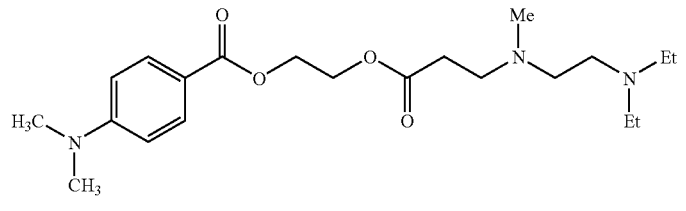 | COINI-07 |
| 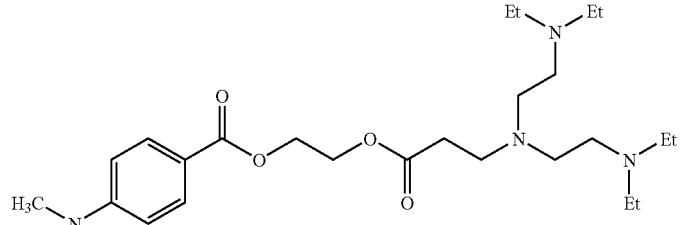 | COINI-08 |
| 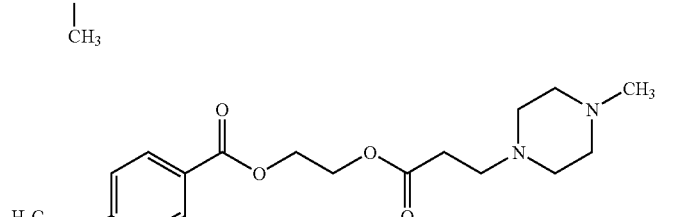 | COINI-09 |
| 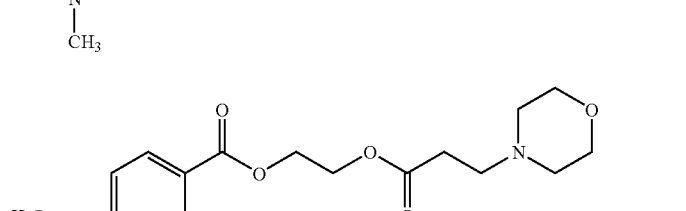 | COINI-10 |
| 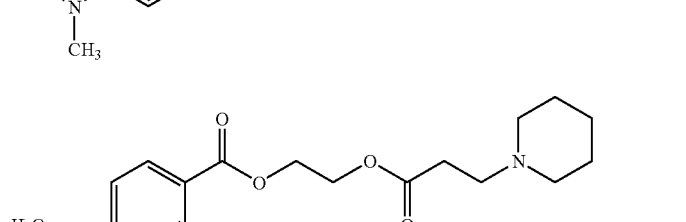 | COINI-11 |

TABLE 1-continued
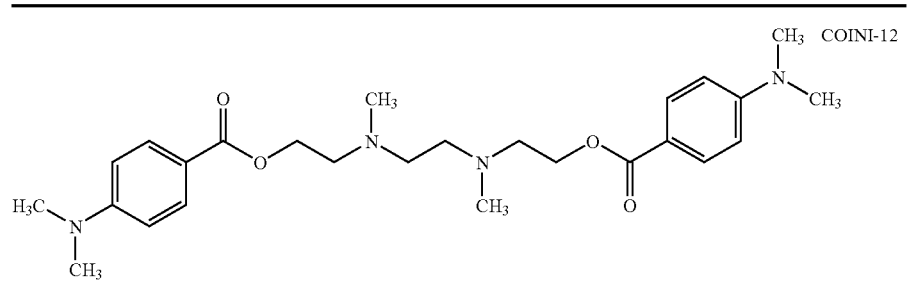
COINI-12
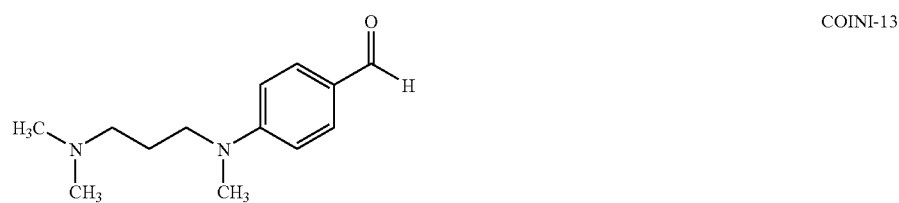
COINI-13
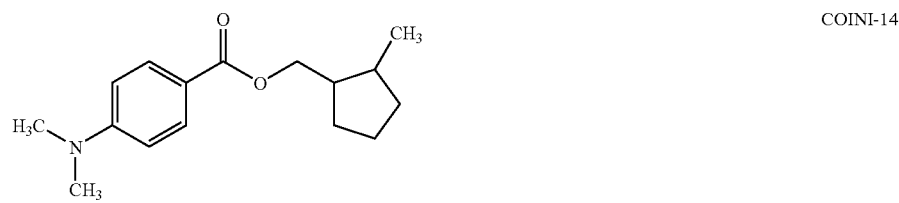
COINI-14
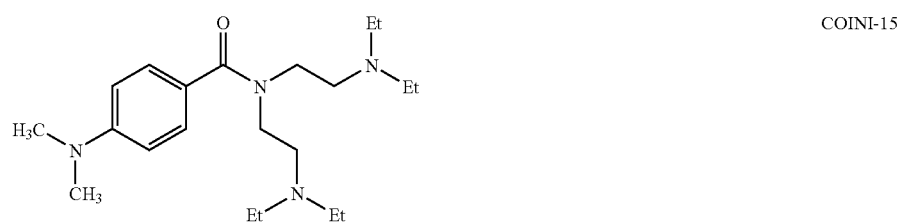
COINI-15
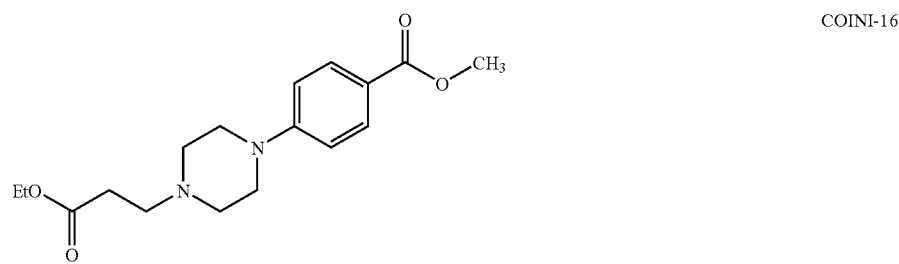
COINI-16
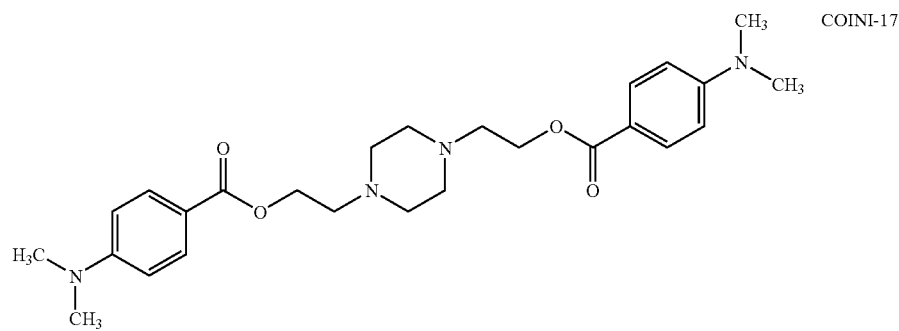
COINI-17

TABLE 1-continued

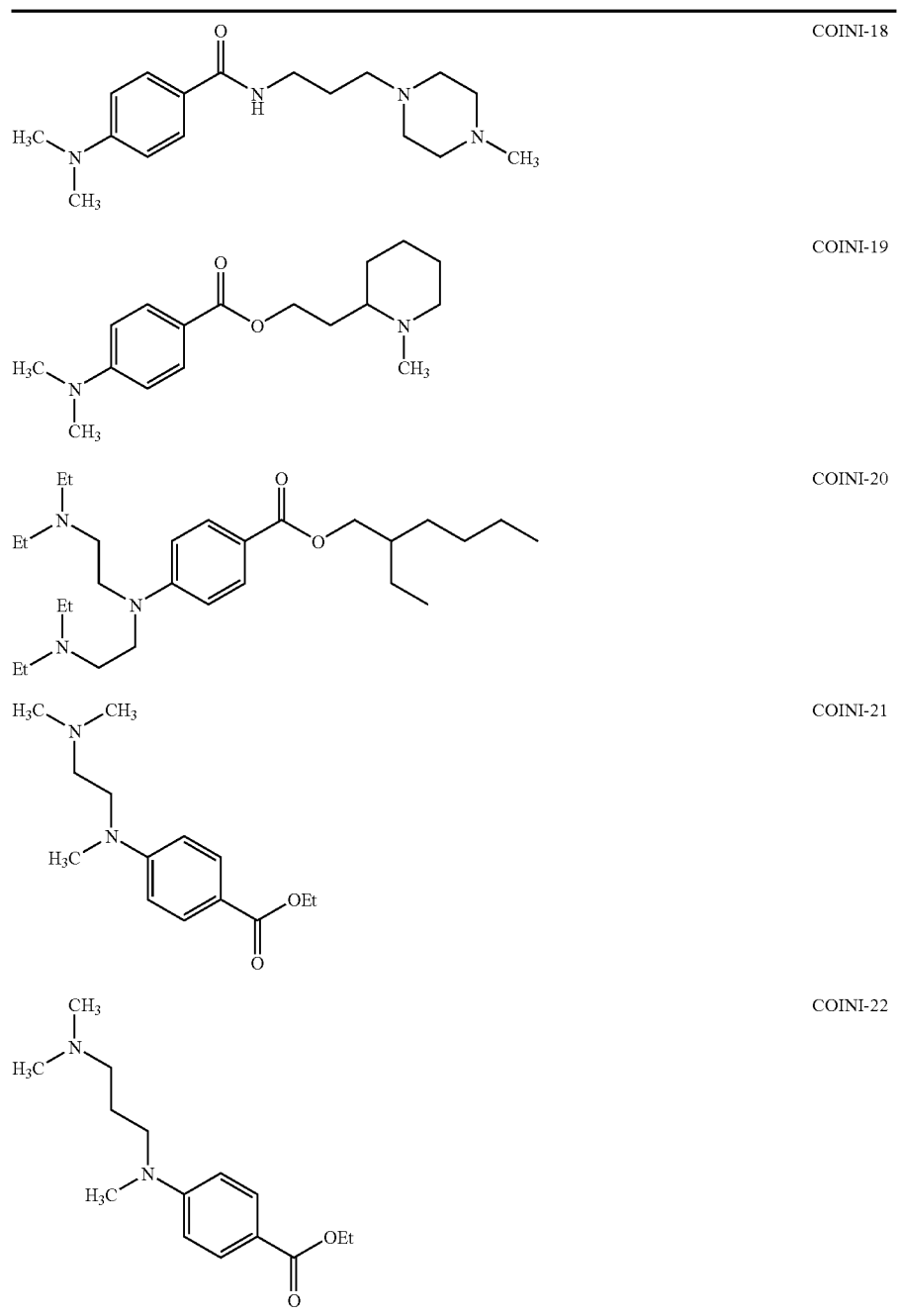

wherein Et = Ethyl; Me = Methyl.

The radiation curable composition may comprise two or more different co-initiators according to the present invention or may comprise one or more co-initiators according to the present invention in combination with one or more co-initiator known in the art.

The total co-initiator amount in the radiation curable compositions is preferably from 0.01 to 20% by weight, more preferably from 0.05 to 15% by weight, most preferably from 0.1 to 10% by weight relative to the total weight of said curable composition.

Photo-Initiator

The radiation curable composition of the present invention comprises one or more photo-initiators. The photo-initiator typically initiates the polymerization upon exposure of said composition. Upon absorption of said radiation, the photo-initiator produces free radicals, thereby inducing polymerization of the curable compounds (monomers, oligomers or (pre)polymers) of said composition. When polyfunctional monomers or oligomers are present as curable compounds, said free radicals may also initiate cross linking.

The photo-initiator may be a Norrish Type I photo-initiator, a Norrish Type II photo-initiator or a combination thereof.

A preferred Norrish type I-initiator is selected from the group consisting of benzoinethers, benzil ketals, α,α-dialkoxy-acetophenones, α-hydroxyalkylphenones, α-aminoalkylphenones, acylphosphine oxides, acylphosphine sulphides, α-haloketones, α-halosulfones and α-halophenylglyoxalates. Particularly preferred are acyl or bisacyl phosphine oxides.

A preferred Norrish type II-initiator is selected from the group consisting of benzophenones, thioxanthones, 1,2-diketones and anthraquinones.

Suitable Type I and Type II photo-initiators are disclosed by J. V. Crivello et al. in "Photoinitiators for Free Radical, Cationic & Anionic Photopolymerisation 2$^{nd}$ edition", Volume III of the Wiley/SITA Series In Surface Coatings Tecnology, edited by G. Bradley and published in 1998 by John Wiley and Sons Ltd London, pages 276 to 294.

Specific examples of photo-initiators may include, but are not limited to, the following compounds or combinations thereof: benzophenone and substituted benzophenones, 1-hydroxycyclohexyl phenyl ketone, thioxanthones such as isopropylthioxanthone, 2-hydroxy-2-methyl-1-phenylpropan-1-one, 2-benzyl-2-dimethylamino-(4-morpholinophenyl) butan-1-one, benzil dimethylketal, bis(2,6-dimethylbenzoyl)-2,4,4-trimethylpentylphosphine oxide, 2,4,6-trimethylbenzoyldiphenylphosphine oxide, 2-methyl-1-[4-(methylthio)phenyl]-2-morpholinopropan-1-one, 2,2-dimethoxy-1,2-diphenylethan-1-one or 5,7-diiodo-3-butoxy-6-fluorone.

Suitable commercial photo-initiators include Irgacure 184, Irgacure 500, Irgacure 907, Irgacure 369, Irgacure 1700, Irgacure 651, Irgacure 819, Irgacure 1000, Irgacure 1300, Irgacure 1870, Darocur 1173, Darocur 2959, Darocur 4265 and Darocur ITX available from CIBA SPECIALTY CHEMICALS, Lucerin TPO available from BASF AG, Esacure KT046, Esacure KIP150, Esacure KT37 and Esacure EDB available from LAMBERTI, H-Nu 470 and H-Nu 470X available from SPECTRA GROUP Ltd.

Since the photo-initiator generates radicals upon absorption of radiation, the photo-initiator is typically chosen as a function of the type of radiation used to cure the curable composition. If two or more types of radiation are used to cure the radiation curable composition, two or more types of photo-initiators may be present.

A preferred amount of initiator is preferably from 0.3 to 50% weight, more preferably from 1 to 25% by weight, most preferably form 2 to 15 percent by weight relative to the total weight of the radiation curable composition.

The radiation curable composition may comprise one or more sensitizers. Upon exposing said composition, the sensitizers may transfer energy to the photo-initiator(s) resulting in free radical formation. Suitable sensitizers include photoreducible xanthene, fluorene, benzoxanthene, benzothioxanthene, thiazine, oxazine, coumarin, pyronine, porphyrin, acridine, azo, diazo, cyanine, merocyanine, diarylmethyl, triarylmethyl, anthraquinone, phenylenediamine, benzimidazole, fluorochrome, quinoline, tetrazole, naphthol, benzidine, rhodamine, indigo and/or indanthrene dyes.

The amount of the sensitizer is preferably from 0.01 to 15% by weight, more preferably from 0.05 to 5% by weight relative of the total weight of said curable composition.

Radiation Curable Composition

The co-initiator according to the present invention can be used in any radiation curable composition such as a varnish, a lacquer, a coating composition and a printing ink. Preferably the radiation curable composition according to the present invention is a radiation curable inkjet ink, most preferably a UV-curable inkjet ink.

Besides the photo-initiators and co-initiators described above the radiation curable inkjet ink further comprises a radiation curable compound and preferably at least one colorant, i.e. a pigment or dye. The radiation curable inkjet ink may further comprise one or more dispersant(s), dispersion synergist(s), inhibitor(s), surfactant(s).

The viscosity of the curable inkjet ink at a shear rate of 100 s$^-$ and a jetting temperature between 25 and 70° C. is preferably lower than 35 mPa·s, more preferably lower than 15 mPa·s, most preferably between 2 and 10 mPa·s.

The curable pigment inkjet ink preferably does not contain an evaporable component, but sometimes, it can be advantageous to incorporate a small amount of an organic solvent in said inks to improve adhesion to the surface of the ink-receiver after UV-curing. In this case, the added solvent can be any amount in the range that does not cause problems of solvent resistance and VOC, and preferably between 0.1-10.0% by weight, more preferably between 0.1-5.0% by weight relative to the total weight of the curable pigment inkjet ink.

Curable Compound(s)

The curable compounds are typically monomers, oligomers or prepolymers or a combination thereof.

The monomers, oligomers and/or prepolymers comprise one, two, three or more polymerizable groups. A mixture of monomers, oligomers and/or prepolymers, having different amounts of polymerizable groups may be used.

The viscosity of the curable composition can be adjusted by varying the ratio between the monomers and oligomers.

Any polymerizable compound commonly known in the art may be employed. Particularly preferred for use as a radiation curable compound in the radiation curable inkjet ink are monofunctional and/or polyfunctional acrylate monomers, oligomers or prepolymers, such as isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, 2-acryloyloxyethyl-hexahydrophthalic acid, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, vinyl ether acrylate, 2-acryloyloxyethylsuccinic acid, 2-acryloxyethylphthalic acid, 2-acryloxyethyl-2-hydroxyethyl-phthalic acid, lactone modified flexible acrylate, and t-butylcyclohexyl acrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri(propylene glycol)triacrylate, caprolactone modified trimethylolpropane triacrylate, pentaerythritol triacrylate, pentaerithritol tetraacrylate, pentaerythritolethoxy tetraacrylate, dipentaerythritol hexaacrylate, ditrimethylolpropane tetraacrylate, glycerinpropoxy triacrylate, and caprolactam modified dipentaerythritol hexaacrylate, or an N-vinylamide such as, N-vinylcaprolactam or N-vinylformamide; or acrylamide or a substituted acrylamide, such as acryloylmorpholine.

Other suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate and alkoxylated cyclohexanone dimethanol diacrylate.

Other suitable difunctional acrylates include alkoxylated cyclohexanone dimethanol diacrylate, alkoxylated hexanediol diacrylate, dioxane glycol diacrylate, dioxane glycol diacrylate, cyclohexanone dimethanol diacrylate, diethylene glycol diacrylate and neopentyl glycol diacrylate.

Other suitable trifunctional acrylates include propoxylated glycerine triacrylate and propoxylated trimethylolpropane triacrylate.

Other higher functional acrylates include di-trimethylolpropane tetraacrylate, dipentaerythritol pentaacrylate, ethoxylated pentaeryhtitol tetraacrylate, methoxylated glycol acrylates and acrylate esters.

Furthermore, methacrylates corresponding to the abovementioned acrylates may be used with these acrylates. Of the methacrylates, methoxypolyethylene glycol methacrylate, methoxytriethylene glycol methacrylate, hydroxyethyl methacrylate, phenoxyethyl methacrylate, cyclohexyl methacrylate, tetraethylene glycol dimethacrylate, and polyethylene glycol dimethacrylate are preferred due to their relatively high sensitivity and higher adhesion to an ink-receiver surface.

Furthermore, the inkjet inks may also contain polymerizable oligomers. Examples of these polymerizable oligomers include epoxy acrylates, aliphatic urethane acrylates, aromatic urethane acrylates, polyester acrylates, and straight-chained acrylic oligomers.

Suitable examples of styrene compounds are styrene, p-methylstyrene, p-methoxystyrene, β-methylstyrene, p-methyl-β-methylstyrene, α-methylstyrene and p-methoxy-β-methylstyrene.

Suitable examples of vinylnaphthalene compounds are 1-vinylnaphthalene, α-methyl-1-vinylnaphthalene, β-methyl-1-vinylnaphthalene, 4-methyl-1-vinylnaphthalene and 4-methoxy-1-vinylnaphthalene.

Suitable examples of N-vinyl heterocyclic compounds are N-vinylcarbazole, N-vinylpyrrolidone, N-vinylindole, N-vinylpyrrole, N-vinylphenothiazine, N-vinylacetoanilide, N-vinylethylacetoamide, N-vinylsuccinimide, N-vinylphthalimide, N-vinylcaprolactam and N-vinylimidazole.

Examples of vinyl ethers having at least one vinyl ether group include ethyl vinyl ether, n-butyl vinyl ether, isobutyl vinyl ether, octadecyl vinyl ether, cyclohexyl vinyl ether, butanediol divinyl ether, hydroxyl butyl vinyl ether, cyclohexane dimethanol monovinyl ether, phenyl vinyl ether, p-methylphenyl vinyl ether, p-methoxyphenyl vinyl ether, α-methylphenyl vinyl ether, β-methyl-isobutyl vinyl ether and β-chloroisobutyl vinyl ether, diethylene-glycol divinyl ether, triethylene glycol divinyl ether, n-propyl vinyl ether, isopropyl vinyl ether, dodecyl vinyl ether, diethylene glycol monovinyl ether, cyclohexanedimethanol divinyl ether, 4-(vinyloxy)butyl benzoate, bis[4-(vinyl oxy)butyl]adipate, bis[4-(vinyl oxy)butyl]succinate, 4-(vinyloxy methyl)cyclohexyl-methyl benzoate, bis[4-(vinyloxy)butyl]isophthalate, bis[4-(vinyl-oxymethyl)cyclohexylmethyl]glutarate, tris[4-(vinyloxy)-butyl]trimellitate, 4-(vinyloxy)butyl steatite, bis[4-(vinyloxy)-butyl]hexanediylbiscarbamate, bis[4-(vinyloxy)methyl]-cyclohexyl]methyl]terephthalate, bis[4-(vinyloxy)methyl]cyclohexyl]methyl]isophthalate, bis[4-(vinyloxy)butyl](4-methyl-1,3-phenylene)-biscarbamate, bis[4-vinyloxy)butyl](methylenedi-4,1-phenylene)biscarbamate and 3-amino-1-propanol vinyl ether.

Colorants

The radiation curable inkjet ink preferably comprises at least one colorant. Colorants may be dyes, but are preferably pigments or a combination thereof. The pigment can also be a precipitated dye having at least one carboxylic acid group or a salt thereof.

The pigment can be black, white, cyan, magenta, yellow, red, orange, violet, blue, green, brown, mixtures thereof, and the like.

The pigment may be chosen from those disclosed by HERBST, Willy et al. "Industrial Organic Pigments, Production, Properties, Applications", 3$^{rd}$ edition, Wiley—VCH, 2004 (ISBN 3527305769).

Particular preferred pigments are C.I. Pigment Yellow 1, 3, 10, 12, 13, 14, 17, 55, 65, 73, 74, 75, 83, 93, 97, 109, 111, 120, 128, 138, 139, 150, 151, 154, 155, 175, 180, 181, 185, 194 and 213.

Particular preferred pigments are C.I. Pigment Red 17, 22, 23, 41, 48:1, 48:2, 49:1, 49:2, 52:1, 57:1, 81:1, 81:3, 88, 112, 122, 144, 146, 149, 169, 170, 175, 176, 184, 185, 188, 202, 206, 207, 210, 216, 221, 248, 251, 254, 264 and 282.

Particular preferred pigments are C.I. Pigment Violet 1, 2, 19, 23, 32, 37 and 39.

Particular preferred pigments are C.I. Pigment Blue 15:1, 15:2, 15:3, 15:4, 16, 56, 61 and (bridged) aluminium phthalocyanine pigments.

Particular preferred pigments are C.I. Pigment Orange 5, 13, 16, 34, 40, 43, 59, 66, 67, 69, 71 and 73.

Particular preferred pigments are C.I. Pigment Green 7 and 36.

Particular preferred pigments are C.I. Pigment Brown 6 and 7.

Suitable pigments also include mixed crystals of the above particular preferred pigments. In mixed crystals, also referred to as solid solutions, the molecules of the components enter into the same crystal lattice, usually, but not always, that of one of the components. The x-ray diffraction pattern of the resulting crystalline solid is characteristic of that solid and can be clearly differentiated from the pattern of a physical mixture of the same components in the same proportion. In such physical mixtures, the x-ray pattern of each of the components can be distinguished, and the disappearance of many of these lines is one of the criteria of the formation of solid solutions. A commercially available example is Cinquasia Magenta RT-355-D from Ciba Specialty Chemicals, which is a mixed crystal of C.I. Pigment Violet 19 and C.I. Pigment Red 202. Under certain conditions different quinacridones mix with each other to form solid solutions For the black ink, suitable pigment materials include carbon blacks such as Regal 400R, Mogul L, Elftex 320 from Cabot Co., or Carbon Black FW18, Special Black 250, Special Black 350, Special Black 550, Printex 25, Printex 35, Printex 55, Printex 150T from DEGUSSA Co., and C.I. Pigment Black 7 and C.I. Pigment Black 11.

A neutral black inkjet ink can be obtained, for example, by mixing carbon black with a cyan, a magenta or a cyan and magenta pigment into the ink, as for example described in pending European patent application EP-A 1 593 718.

The inkjet application may also require one or more spot colours, for example for packaging inkjet printing or textile inkjet printing. Silver and gold are often desired colours for inkjet poster printing and point-of-sales displays. Particular preferred pigments are C.I. Pigment Metal 1, 2 and 3. Illustrative examples of the inorganic pigments include titanium oxide, barium sulfate, calcium carbonate, zinc oxide, lead sulfate, yellow lead, zinc yellow, red iron oxide (III), cadmium red, ultramarine blue, prussian blue, chromium oxide green, cobalt green, amber, titanium black and synthetic iron black. Titanium dioxide is a preferred pigment for a white ink.

Pigment particles in pigmented inkjet ink should be sufficiently small to permit free flow of the ink through the inkjet-printing device, especially at the ejecting nozzles. It is also desirable to use small particles for maximum colour strength and to slow down sedimentation.

The average particle size of the pigment in pigmented inkjet ink should be between 0.005 and 15 µm. Preferably, the average pigment particle size is between 0.005 and 5 µm, more preferably between 0.005 and 1 µm, particularly preferably between 0.005 and 0.3 µm and most preferably between 0.040 and 0.150 µm. Larger pigment particle sizes may be used as long as the objectives of the present invention are achieved.

Dispersant

The radiation curable inkjet ink may further comprise a dispersant in order to obtain a stable dispersion of the pigment(s) in the inkjet ink.

Preferred dispersants are disclosed in the unpublished EP-A 06 122 098 (filed 11 Oct. 2006), paragraph [51] to [87].

Dispersion Synergist

The radiation curable inkjet ink may further comprise a dispersion synergist. A dispersion synergist is used for improving the dispersion quality and stability of the pigment dispersions in the inkjet ink. A mixture of dispersion synergists may be used to further improve dispersion stability.

The dispersion synergist usually consists of an anionic part and a cationic part. The anionic part of the dispersion synergist exhibits often a certain molecular similarity with the colour pigment and the cationic part of the dispersion synergist consists of one or more protons and/or cations to compensate the charge of the anionic part of the dispersion synergist.

The curable magenta inkjet ink according to the present invention preferably contains a dispersion synergist.

Preferred dispersion synergyst are disclosed in the unpublished EP-As 05 111 356, 05 111 357, 05 111 358 and 05 111 360 (all filed 28 Nov. 2005).

Inhibitors

The radiation curable composition may also contain a polymerization inhibitor, also referred to as stabilizers. Suitable polymerization inhibitors include phenol type antioxidants, hindered amine light stabilizers, phosphor type antioxidants, hydroquinone monomethyl ether, hydroquinone, t-butylcatechol or pyrogallol.

Suitable commercial inhibitors are, for example, Sumilizer GA-80, Sumilizer GM and Sumilizer GS produced by Sumitomo Chemical Co. Ltd.; Genorad 16, Genorad 18 and Genorad 20 from Rahn AG; Irgastab UV10 and Irgastab UV22, Tinuvin 460 and CGS20 from Ciba Specialty Chemicals; Floorstab UV range (UV-1, UV-2, UV-5 and UV-8) from Kromachem Ltd, Additol S range (S100, S110, S120 and S130) from Cytec Surface Specialties.

Since excessive addition of these polymerization inhibitors will lower the ink sensitivity to curing, it is preferred that the amount capable of preventing polymerization is determined prior to blending. The amount of a polymerization inhibitor is preferably lower than 5% by weight, more preferably lower than 2.5% by weight relative the total weight of the inkjet ink composition.

Surfactant

The curable pigment inkjet inks may further contain a surfactant. The surfactant(s) can be anionic, cationic, non-ionic, or zwitter-ionic and are usually added in a total quantity below 20% by weight relative to the total ink weight and particularly in a total quantity below 10% by weight relative to the total ink weight.

A fluorinated or silicone comprising surfactant may be used, preferably comprising a cross-linkable group such as silicone modified acrylates, silicone modified methacrylates, acrylated siloxanes, polyether modified acrylic modified siloxanes, fluorinated acrylates, and fluorinated methacrylates. Polymerizable monomers having surface-active effects can be mono-, di-, tri- or higher functional (meth)acrylates or mixtures thereof.

Preparation of an Inkjet Ink

The curable inkjet inks may be prepared by milling the pigment in the dispersion medium, preferably in the presence of a polymeric dispersant.

Mixing apparatuses may include a pressure kneader, an open kneader, a planetary mixer, a dissolver, and a Dalton Universal Mixer. Suitable milling and dispersion apparatuses are a ball mill, a pearl mill, a colloid mill, a high-speed disperser, double rollers, a bead mill, a paint conditioner, and triple rollers. The dispersions may also be prepared using ultrasonic energy.

Many different types of materials may be used as milling media, such as glasses, ceramics, metals, and plastics. In a preferred embodiment, the grinding media can comprise particles, preferably substantially spherical in shape, e.g. beads consisting essentially of a polymeric resin or yttrium stabilized zirconium oxide beads.

In the process of mixing, milling and dispersion, each process is performed with cooling to prevent build up of heat, and as much as possible under light conditions in which actinic radiation has been substantially excluded.

The curable pigment inkjet ink may contain more than one pigment, the inkjet ink may be prepared using separate dispersions for each pigment, or alternatively several pigments may be mixed and co-milled in preparing the dispersion.

The dispersion process can be carried out in a continuous, batch or semi-batch mode.

The preferred amounts and ratios of the ingredients of the mill grind will vary widely depending upon the specific materials and the intended applications. The contents of the milling mixture comprise the mill grind and the milling media. The mill grind comprises pigment, polymeric dispersant and a liquid carrier. For inkjet inks, the pigment is usually present in the mill grind at 1 to 50% by weight, excluding the milling media. The weight ratio of pigment over polymeric dispersant is 20:1 to 1:2.

The milling time can vary widely and depends upon the pigment, the selected mechanical means and residence conditions, the initial and desired final particle size, etc. In the present invention pigment dispersions with an average particle size of less than 150 nm may be prepared.

After milling is completed, the milling media is separated from the milled particulate product (in either a dry or liquid dispersion form) using conventional separation techniques, such as filtration, sieving through a mesh screen, and the like. Often the sieve is built into the mill, e.g. for a bead mill. The milled pigment concentrate is preferably separated from the milling media by filtration.

In general it is desirable to make the inkjet inks in the form of a concentrated mill grind, which is subsequently diluted to the appropriate concentration for use in the inkjet printing system. This technique permits preparation of a greater quantity of pigmented ink from the equipment. By dilution, the inkjet ink is adjusted to the desired viscosity, surface tension, colour, hue, saturation density, and print area coverage for the particular application.

In preparing the inkjet ink, it is preferred that one or more degassing steps are performed to remove air or gas bubbles from the ink. Degassing is preferably performed by heating and/or reduced pressure. The degassing step(s) can be performed on the concentrated pigment dispersion and/or on the final inkjet ink composition.

Printing Means

The curable inkjet ink may be jetted by one or more printing heads ejecting small droplets of ink in a controlled manner through nozzles onto an ink-receiver surface, which is moving relative to the printing head(s).

A preferred printing head for the inkjet printing system is a piezoelectric head. Piezoelectric inkjet printing is based on the movement of a piezoelectric ceramic transducer when a voltage is applied thereto. The application of a voltage changes the shape of the piezoelectric ceramic transducer in the printing head creating a void, which is then filled with ink. When the voltage is again removed, the ceramic expands to its original shape, ejecting a drop of ink from the print head. However the inkjet printing method according to the present invention is not restricted to piezoelectric inkjet printing. Other inkjet printing heads can be used and include various types, such as a continuous type and thermal, electrostatic and acoustic drop on demand type.

At high printing speeds, the inks must be ejected readily from the printing heads, which puts a number of constraints on the physical properties of the ink, e.g. a low viscosity at the jetting temperature, which may vary from 25° C. to 110° C., a surface energy such that the printing head nozzle can form the necessary small droplets, a homogenous ink capable of rapid conversion to a dry printed area.

The inkjet printing head normally scans back and forth in a transversal direction across the moving ink-receiver surface. Often the inkjet print head does not print on the way back. Bi-directional printing is preferred for obtaining a high areal throughput. Another preferred printing method is by a "single pass printing process", which can be performed by using page wide inkjet printing heads or multiple staggered inkjet printing heads which cover the entire width of the ink-receiver surface. In a single pass printing process the inkjet printing heads usually remain stationary and the ink-receiver surface is transported under the inkjet printing heads.

Curing Means

The radiation curable composition, preferably the radiation curable inkjet ink, can be cured by exposing to actinic radiation and/or by electron beam curing. Preferably the curing is performed by an overall exposure to actinic radiation or by an overall electron beam curing.

The curing means may be arranged in combination with the print head of the inkjet printer, travelling therewith so that the curable liquid is exposed to curing radiation very shortly after been jetted.

In such an arrangement it can be difficult to provide a small enough radiation source connected to and travelling with the print head. Therefore, a static fixed radiation source may be employed, e.g. a source of curing UV-light, connected to the radiation source by means of flexible radiation conductive means such as a fibre optic bundle or an internally reflective flexible tube.

Alternatively, the actinic radiation may be supplied from a fixed source to the radiation head by an arrangement of mirrors including a mirror upon the radiation head.

The source of radiation arranged not to move with the print head, may also be an elongated radiation source extending transversely across the ink-receiver surface to be cured and adjacent the transverse path of the print head so that the subsequent rows of images formed by the print head are passed, stepwise or continually, beneath that radiation source.

The radiation source is preferably a ultraviolet radiation source. Ultraviolet radiation or light is also referred to as UV-radiation or UV-light. Any UV-light source, as long as part of the emitted light is absorbed by the photo-initiator or the photo-initiator system, may be employed as a radiation source, such as a high or low pressure mercury lamp, a cold cathode tube, a black light, an ultraviolet LED, an ultraviolet laser or a flash light. Of these, the preferred source is one exhibiting a relatively long wavelength UV-contribution having a dominant wavelength of 300-400 nm. Specifically, a UV-A light source is preferred due to the reduced light scattering therewith resulting in more efficient interior curing.

UV radiation is generally classed as UV-A, UV-B, and UV-C as follows:

UV-A: 400 nm to 320 nm

UV-B: 320 nm to 290 nm

UV-C: 290 nm to 100 nm

Furthermore, it is possible to cure the image using, consecutively or simultaneously, two light sources of differing wavelength or illuminance. For example, the first UV-source can be selected to be rich in UV-C, in particular in the range of 260 nm-200 nm. The second UV-source can then be rich in UV-A, e.g. a gallium-doped lamp, or a different lamp high in both UV-A and UV-B. The use of two UV-sources has been found to have advantages e.g. a fast curing speed.

For facilitating curing, the inkjet printer often includes one or more oxygen depletion units. The oxygen depletion units place a blanket of nitrogen or other relatively inert gas (e.g. $CO_2$), with adjustable position and adjustable inert gas concentration, in order to reduce the oxygen concentration in the curing environment. Residual oxygen levels are usually maintained as low as 200 ppm, but are generally in the range of 200 ppm to 1200 ppm.

EXAMPLES

Materials

All materials used in the examples were readily available from standard sources such as Aldrich Chemical Co. (Belgium) and Acros (Belgium) unless otherwise specified.

Solsperse 39000 is a polyethyleneimine-polyester dispersant from NOVEON.

Solsperse 32000 is a polyethyleneimine-polyester dispersant from NOVEON.

Solsperse 5000 is a sulfonated copper phthalocyanine dispersion synergist from NOVEON.

DPGDA is a difunctional acrylate monomer available from CYTEC SURFACE SPECIALTIES Sartomer SR9003 is a difunctional acrylate monomer available from SARTOMER.

Craynor CN386 is an amine modified acrylate synergist from SARTOMER.

Darocur TPO is a type I photo-initiator from CIBA SPECIALTY CHEMICALS.

Genocure ITX is a type II photo-initiator from RAHN AG.

Genocure EPD is an amine synergist from RAHN AG.

Genorad 16 is a stabilizer for UV-curable compositions available from RAHN AG.

Byk333 is a surfactant available from BYK CHEMIE Gmbh. In the examples Byk333 is used as a 1 wt % solution in DPGDA.

PB15:3 is an abbreviation for the cyan pigment Sun Fast Blue 15:3 from SUN CHEMICAL CORPORATION.

PB15:4 is an abbreviation for the cyan pigment Hostaperm Blue P-BFS available from CLARIANT.

COMPCOINO-01 is an aliphatic co-initiator according to the following formula

COMPCOINI-01

Measurement Methods

Curing speed, viscosity and amount of extractables were used to evaluate the UV curable inkjet ink.

Curing speed: the percentage of the maximum output of the lamp was taken as a measure for the curing speed, the lower the number the higher the curing speed. A sample was considered fully cured at the moment scratching with a Q-tip caused no visual damage.

Viscosity: the viscosity of the curable compositions was measured with a Brookfield DV-II+ at 25° C. and a shear rate 3 RPM.

Amount of extractables: a sample of 30 mm in diameter was taken from the coated and cured curable compositions. The sample was put in a beaker of 50 ml and extracted three times with 3 ml acetonitrile using ultrasound. The acetonitrile extracts were combined and the volume adjusted to 10 ml. Reference samples were made by dissolving 1 mg of the reference compound (the co-initiator) in 50 ml acetonitrile. The samples were analyzed on a Alltime C18 5 µm HPLC column (150×3.2 mm) equipped with a Alltime C18 5 µm precolumn (7.5×3.2 mm) (from Alltech). An amount of 5 µl of the reference samples and 10 µl of the extraction samples were injected. A gradient elution was used starting from acetonitrile/water 80/20 going to 100% acetonitrile over 12 minutes and switching again to acetonitrile/water 80/20 over one minute followed by equilibration of the column for 7 minutes. The total peak area compared to the reference samples was taken as a measure for the amount of co-initiator extracted from the cured composition.

Example 1

Synthesis of the Co-Initiators

Synthesis of COINI-01

COINI-01 has been prepared according to scheme 1.

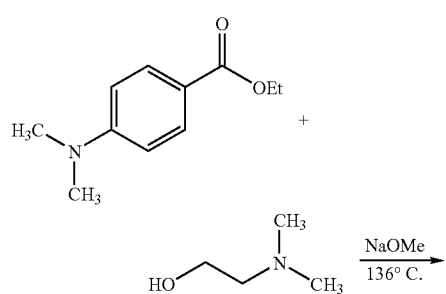

Scheme 1

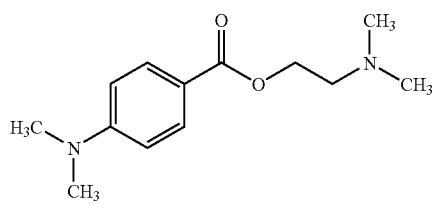

A reaction mixture containing 12.0 g N,N-dimethylaminoethanol, 8.7 g ethyl-4-dimethylaminobenzoate and 0.146 g of a 30 wt % solution of sodium methylate (NaOMe) in methanol was heated to 136° C. and stirred for about 24 hours. Meanwhile the formed ethanol was distilled off. The mixture was filtered to remove the formed precipitate. The filtrate was diluted with 70 ml of toluene and extracted with 50 ml of distilled water. The organic layer was separated, washed with water and dried over MgSO$_4$. After evaporation of the solvent, the residue was recrystallized from n-hexane. After filtration 2.9 g of a pale yellow solid was obtained.

Synthesis of COINI-02

COINI-02 has been prepared according to scheme 2.

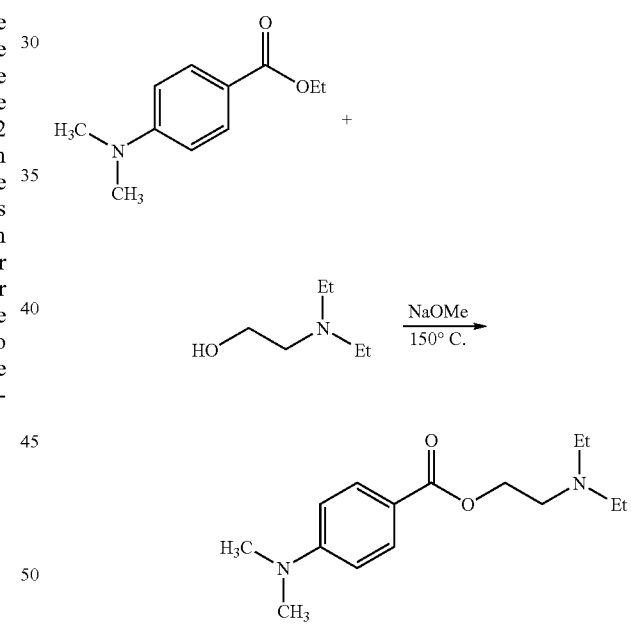

Scheme 2

A reaction mixture containing 15.9 g of N,N-diethyl ethanol-amine, 8.7 g of ethyl-4-dimethylaminobenzoate and 0.146 g of a 30 wt % solution of sodium methylate (NaOMe) in methanol was heated to 150° C. and stirred for about 24 hours. Meanwhile the formed ethanol was distilled off. The mixture was filtered to remove the formed precipitate. The filtrate was diluted with 70 ml of toluene and extracted with 50 ml of distilled water. The organic layer was separated, washed with water and dried over MgSO$_4$. After evaporation of the solvent, the product was purified on a Flash Column using as eluent dichloromethane/ethanol (90/10). 1.97 g of a yellow oil was obtained.

Synthesis of COINI-03

COINI-03 has been prepared according to scheme 3.

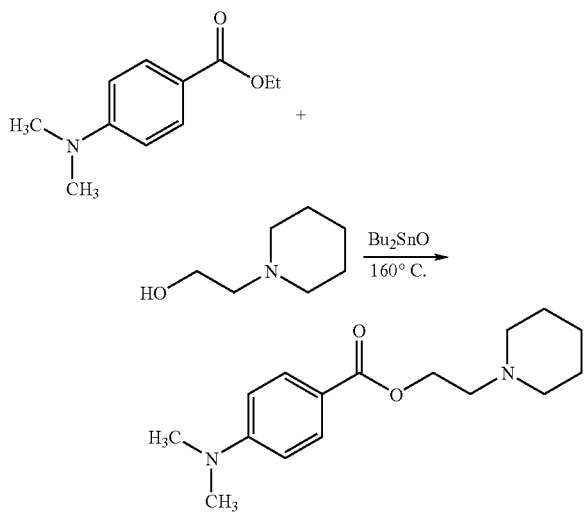

A reaction mixture containing 17.4 g of N-piperidine ethanol, 8.7 g of ethyl-4-dimethylaminobenzoate and 0.67 g of dibutyltin ($Bu_2SnO$) oxide was heated at 160° C. and stirred for about 8 hours. Meanwhile the formed ethanol was distilled off. The reaction mixture was diluted with 70 ml of toluene and extracted with 70 ml of distilled water. The aqueous layer was separated and extracted with toluene. The organic layers were collected and dried over $MgSO_4$. After evaporation of the solvent, the product was purified on a Flash Column using dichloromethane/ethanol (90/10) as eluent, to obtain 10.2 g of a pale yellow solid.

Synthesis of COINI-04

COINI-04 has been prepared according to scheme 4.

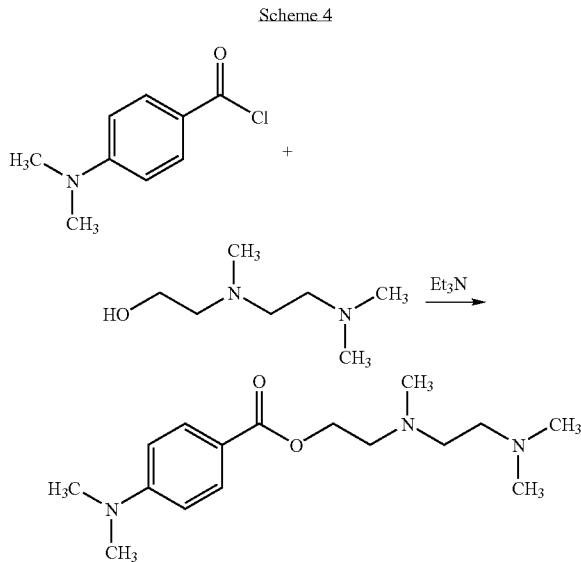

After cooling a solution of 2.8 g of 2-{[2-(dimethylamino) ethyl]methylamino} ethanol and 1.9 g of triethylamine in 25 ml ethyl acetate, 3.5 g of 4-(dimethylamino)benzoylchloride was slowly added while the temperature was kept between 0° C. and 5° C., inducing precipitation of triethylamine hydrochloride. The reaction mixture was allowed to stir for 15 minutes at 0° C. and for 24 hours at room temperature. The reaction mixture was filtered and the precipitate washed with ethyl acetate. The filtrate was extracted with a 2/5 mixture of a 1 M aqueous solution of sodium carbonate and distilled water (pH=±10). The organic layer was separated, dried over $MgSO_4$ and the solvent was evaporated under reduced pressure. The product was purified on a Prochrom LC80 Column using ethanol/water/ammonium acetate (50/50/0.2 M) as eluent. After evaporation of ethanol, the pH of the aqueous layer was brought to 11 with sodium carbonate, and extracted with ethyl acetate. The organic layer was separated and dried over $MgSO_4$. After evaporation of the solvent 1.0 g of a colourless oil was obtained.

Synthesis of COINI-05 to COINI-08

COINI-05 to COINI-08 have been prepared according to scheme 5.

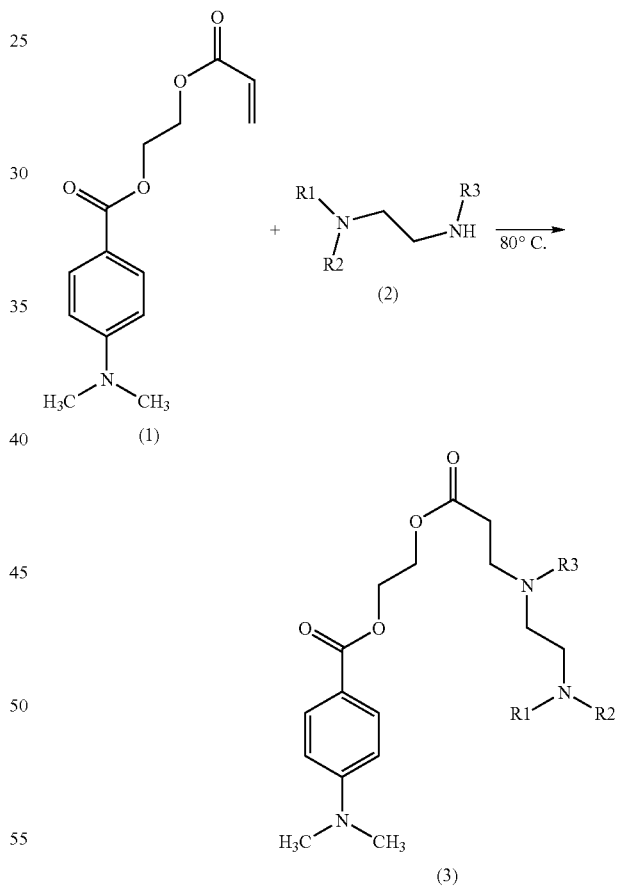

The different aliphatic amines (2) used in scheme 5 to obtain the different co-initiators (3) are given in Table 2.

TABLE 2

| R1 | R2 | R3 | |
|----|----|----|---|
| Me | Me | Me | COINI-05 |
| Et | Et | Et | COINI-06 |

TABLE 2-continued

| R1 | R2 | R3 | |
|----|----|----|----|
| Et | Me | Me | COINI-07 |
| Et | Et | CH$_2$—CH$_2$—NEt$_2$ | COINI-08 | wherein Me = Methyl, Et = Ethyl 5.0 g of compound (1), prepared according to example 2 disclosed in WO 1988/009783 (Biopolymers Limited), was heated to 80° C., followed by a dropwise addition of 0.025 moles of the amine (2). Upon completion of the addition of the amine, the mixture was stirred for 1 hour at 80° C. The reaction mixture was diluted with 150 ml of ethylacetate and extracted twice with 50 ml distilled water. Finally the organic layer was dried over anhydrous magnesium sulfate. After evaporation of the solvent, COINI-05 to COINI-08 (3) were obtained as a yellow oil.

Synthesis of COINI-09 to COINI-11

COINI-09 to COINI-11 have been prepared according to scheme 6.

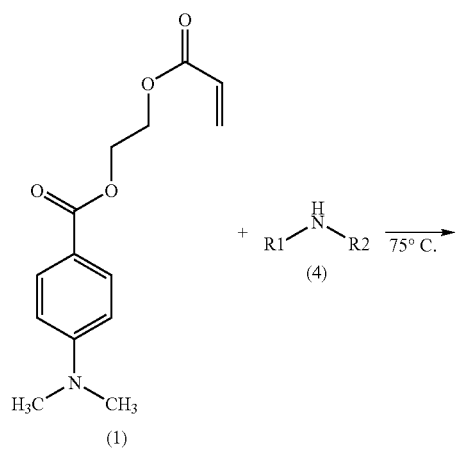

The different aliphatic amines (4) used in scheme 6 to obtain the different co-initiators (5) are given in Table 3.

TABLE 3

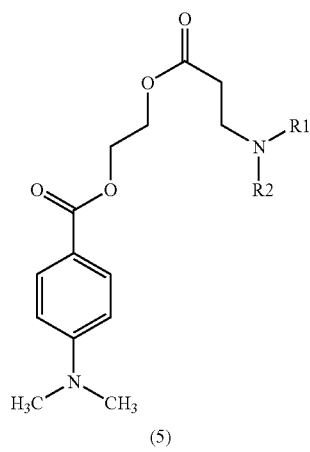

20 g of compound (1) was heated to 75° C. followed by a drop wise addition of 0.098 moles of the amine (4). Upon completion of the addition of the amine, the mixture was stirred for 1 hour at 75° C.

For COINI-09 the reaction mixture was diluted with 150 ml of ethyl acetate and extracted twice with 100 ml of distilled water. The organic layer was dried over anhydrous magnesium sulfate. Upon evaporation of the solvent, a yellow oil was obtained. The crude COINI-09 was purified by preparative column chromatography on a Prochrom LC80, using a gradient elution from methylene chloride to methylene chloride/methanol 80/20 on Kromasil Si 60 Å 10 µm.

For COINI-10 and COINI-11 the reaction mixture was diluted with 50 ml of acetone. The precipitated solid was filtrated and the filtrate was evaporated under reduced pressure. The crude COINI-10 and COINI-11 were purified by preparative column chromatography on a Prochrom LC80, using a gradient elution from methylene chloride to methylene chloride/isopropanol 80/20 on Kromasil Si 60 Å 10 µm.

Synthesis of COINI-21

COINI-21 has been prepared according to scheme 7.

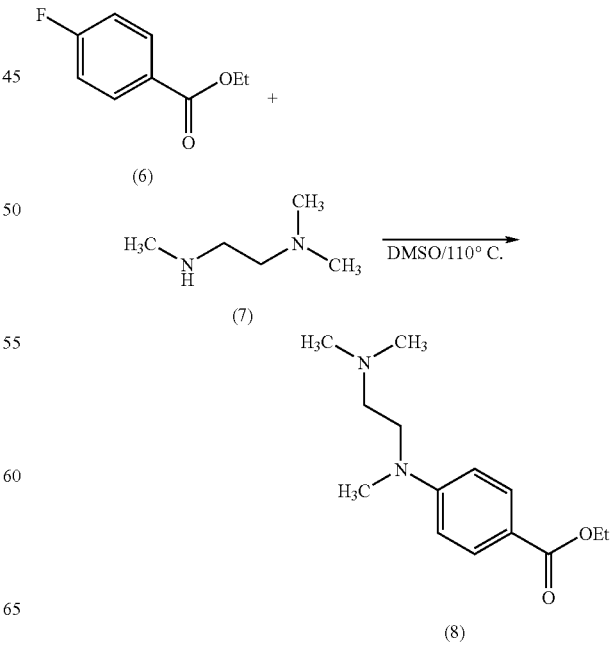

6.27 g of 4-fluorobenzoic acid ethyl ester (6) was dissolved in 25 ml of dimethylsulfoxide (DMSO). 11.43 g of N,N,N'-trimethyl-ethylene diamine (7) was added and the mixture was heated to 110° C. for 40 hours. An additional 8.65 g of N,N,N'-trimethyl-ethylene diamine was added and the mixture was further heated for 24 hours. The mixture was allowed to cool down to room temperature and was pourred into a diluted KHCO$_3$-solution. The mixture was extracted three times with 80 ml ethyl acetate. The organic fractions were extracted three times with water and dried over MgSO$_4$. The solvent was evaporated under reduced pressure and the crude product was purified by preparative column chromatography on straight phase silica using a gradient elution from methylene chloride/methanol 20/1 to methylene chloride/methanol 10/1. 8.19 g of COINI-21 (8) was isolated.

Synthesis of COINI-22

COINI-22 has been prepared according to scheme 8.

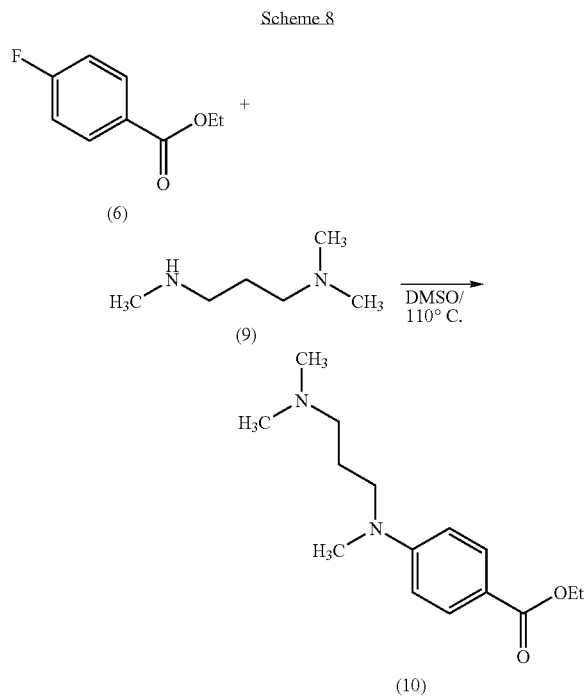

7.15 g of 4-fluorobenzoic acid ethyl ester (6) was dissolved in 28.5 ml dimethylsulfoxide DMSO. 15.53 g of N,N,N'-trimethyl-propylene diamine (9) was added and the mixture was heated to 110° C. for 50 hours. The mixture was allowed to cool down to room temperature and pourred into a dilute KHCO$_3$-solution. The mixture was extacted three times with 80 ml of ethyl acetate. The organic fractions were extracted three times with water, dried over MgSO$_4$ and evaporated under reduced pressure. The crude product was purified by preparative column chromatography on straight phase silica using a gradient elution from methylene chloride 20/1 to methylene chloride/methanol 5/1. 8.74 g of COINI-22 (10) was isolated.

Example 2

This example illustrates the high curing speed of inventive inkjet inks comprising a Type I photo-initiator.

Preparation of Inkjet Inks INV-01 to INV-05 and COMP-01 to COMP-03

Preparation of the Concentrated Cyan Dispersion I

The concentrated cyan dispersion I was prepared by mixing the pigment, the dispersant, the dispersion synergist and the stabilizer with a dissolver and treating this mixture with an Eiger bead mill. The composition of the cyan dispersion I is given in Table 4.

TABLE 4

| wt % of: | Cyan dispersion I |
| --- | --- |
| PB15:4 | 20.0 |
| Solsperse 39000 | 20.0 |
| Solsperse 5000 | 0.5 |
| Genorad 16 | 1.0 |
| DPGDA | 58.5 |

Preparation of the UV Curable Inkjet Ink

The composition of the UV curable inkjet inks INV-01 to INV-05 and COMP-01 to COMP-03 is given in Table 5. The inks were made by adding the ink components from Table 5 to the concentrated cyan pigment dispersion I under stirring at room temperature. The weight % (wt %) is based on the total weight of the radiation curable composition. Each sample comprises an equivalent amount (on molar basis) of co-initiator.

TABLE 5

| wt % of: | INV-01 | INV-02 | INV-03 | INV-04 | INV-05 | COMP-01 | COMP-02 | COMP-03 |
| --- | --- | --- | --- | --- | --- | --- | --- | --- |
| DPGDA | 29.5 | 29.0 | 27.5 | 27.0 | 26.0 | 26.5 | 31.0 | 23.0 |
| Sartomer SR9003 | 40.0 | 40.0 | 40.0 | 40.0 | 40.0 | 40.0 | 40.0 | 40.0 |
| COINI-03 | 5.0 | — | — | — | — | — | — | — |
| COINI-04 | — | 5.5 | — | — | — | — | — | — |
| COINI-06 | — | — | 7.5 | — | — | — | — | — |
| COINI-07 | — | — | — | 7.0 | — | — | — | — |
| COINI-08 | — | — | — | — | 8.5 | — | — | — |
| Craynor CN386 | — | — | — | — | — | 8.0 | — | 8.0 |
| Genocure EPD | — | — | — | — | — | — | 3.5 | 3.5 |
| Cyan dispersion I | 13.5 | 13.5 | 13.5 | 13.5 | 13.5 | 13.5 | 13.5 | 13.5 |
| Darocur TPO | 10.0 | 10.0 | 10.0 | 10.0 | 10.0 | 10.0 | 10.0 | 10.0 |
| 50% Genorad 16 in DPGDA | 2.0 | 2.0 | 2.0 | 2.0 | 2.0 | 2.0 | 2.0 | 2.0 |

The UV curable inkjet ink compositions INV-01 to INV-05 and COMP-01 to COMP-03 were coated on an unsubbed 100 μm PET substrate, using a bar coater and a 10 μm wired bar. Each coated layer was cured on a Fusion DRSE-120 conveyer, equipped with a Fusion VPS/I600 lamp (D-bulb), which transported the samples under the UV-lamp on a conveyer belt at a speed of 20 m/min. The curing speed and viscosity, determined as described above, are summarized in Table 6.

TABLE 6

| Radiation curable composition | Viscosity (mPa·s) | Curing speed |
|---|---|---|
| INV-01 | 22 | 95 |
| INV-02 | 70 | 50 |
| INV-03 | 36 | 95 |
| INV-04 | 53 | 95 |
| INV-05 | 97 | 95 |
| COMP-01 | 25 | >200 |
| COMP-02 | 22 | >200 |
| COMP-03 | 25 | >200 |

From Table 6, it is clear that all inventive UV curable inkjet ink compositions (INV-01 to INV-05) showed a high curing speed while none of the comparative UV curable inkjet ink compositions (COMP-01 to COMP-03) were cured, even at 10 m/min (=200%). Even the comparative example (COMP-03), comprising a mixture of the two types of comparative co-initiators, did not cure under ambient atmosphere, clearly illustrating the high efficiency of the co-initiators of the present invention in combination with a Type I photo-initiator.

Example 3

This example illustrates the high curing speed and/or low viscosity of inkjet inks according to the present invention comprising a Type II photo-initiator. This example also illustrates the low amount of extractables, after curing of these inventive inkjet inks.

Preparation of Inkjet Inks INV-06 to INV-12 and COMP-04

Preparation of the Concentrated Cyan Dispersion II

The concentrated cyan dispersion II was prepared by mixing the pigment, the dispersant, the dispersion synergist with a dissolver and treating this mixture with an Eiger bead mill. The composition of the cyan dispersion II is given in Table 7.

TABLE 7

| wt % of: | Cyan dispersion II |
|---|---|
| PB15:3 | 14.0 |
| Solsperse 32000 | 14.0 |
| Solsperse 5000 | 3.5 |
| DPGDA | 68.5 |

Preparation of the UV Curable Inkjet Ink

The composition of the UV curable inkjet inks INV-06 to INV-12 and COMP-04 is given in Table 8. The inks were made by adding the ink components from Table 8 to the concentrated cyan pigment dispersion II under stirring at room temperature. The weight % (wt %) was based on the total weight of the radiation curable composition. Each sample comprises an equivalent amount (on molar basis) of co-initiator.

TABLE 8

| wt % of: | INV-06 | INV-07 | INV-08 | INV-09 | INV-10 | INV-11 | INV-12 | COMP-04 |
|---|---|---|---|---|---|---|---|---|
| DPGDA | 30.7 | 30.2 | 29.7 | 29.7 | 27.2 | 27.2 | 25.7 | 22.2 |
| Sartomer SR9003 | 40.0 | 40.0 | 40.0 | 40.0 | 40.0 | 40.0 | 40.0 | 40.0 |
| COINI-01 | 5.0 | — | — | — | — | — | — | — |
| COINI-02 | — | 5.5 | — | — | — | — | — | — |
| COINI-03 | — | — | 6.0 | — | — | — | — | — |
| COINI-04 | — | — | — | 6.0 | — | — | — | — |
| COINI-06 | — | — | — | — | 8.5 | — | — | — |
| COINI-07 | — | — | — | — | — | 8.5 | — | — |
| COINI-08 | — | — | — | — | — | — | 10.0 | — |
| Genocure EPD | — | — | — | — | — | — | — | 4.0 |
| Craynor CN386 | — | — | — | — | — | — | — | 9.5 |
| Cyan dispersion II | 14.3 | 14.3 | 14.3 | 14.3 | 14.3 | 14.3 | 14.3 | 14.3 |
| Genocure ITX | 5.0 | 5.0 | 5.0 | 5.0 | 5.0 | 5.0 | 5.0 | 5.0 |
| 50% Genorad 16 in DPGDA | 2.0 | 2.0 | 2.0 | 2.0 | 2.0 | 2.0 | 2.0 | 2.0 |
| BYK333 | 3.0 | 3.0 | 3.0 | 3.0 | 3.0 | 3.0 | 3.0 | 3.0 |

The UV curable inkjet ink compositions INV-06 to INV-12 and COMP-04 were coated on an unsubbed 100 μm PET substrate, using a bar coater and a 10 μm wired bar. Each coated layer was cured on a Fusion DRSE-120 conveyer, equipped with a Fusion VPS/I600 lamp (D-bulb), which transported the samples under the UV-lamp on a conveyer belt at a speed of 20 m/min. The curing speed, viscosity and extractables are summarized in Table 9.

TABLE 9

| Radiation curable composition | Viscosity (mPa·s) | Curing speed | Extractables (mg/m$^2$) |
|---|---|---|---|
| INV-06 | 21 | 50 | 10.8 |
| INV-07 | 23 | 70 | 11.3 |
| INV-08 | 16 | 50 | 14.9 |
| INV-09 | 30 | 45 | 7.9 |
| INV-10 | 22 | 40 | 1.5 |
| INV-11 | 25 | 40 | 5.4 |
| INV-12 | 30 | 40 | <0.5 |
| COMP-04 | 23 | 50 | 22.2 |

From Table 9, it is clear that the inventive UV curable inkjet inks (INV-06 to INV-12) exhibited a lower amount of extractables, a lower viscosity and/or a higher curing speed compared to the comparative example COMP-04.

Example 4

This example illustrates the high curing speed of inventive inkjet inks comprising a Type II photo-initiator.

Preparation of the UV Curable Inkjet Ink

The composition of the UV curable inkjet inks INV-13 to INV-16 and COMP-05 and COMP-06 is given in Table 10. The inks were made by adding the ink components from Table 10 to the concentrated cyan pigment dispersion II, as described in Example 3, under stirring at room temperature. The weight % (wt %) was based on the total weight of the radiation curable composition.

TABLE 10

| wt % of: | INV-13 | INV-14 | INV-15 | INV-16 | COMP-05 | COMP-06 |
|---|---|---|---|---|---|---|
| DPGDA | 31.5 | 26.5 | 31.0 | 26.0 | 27.5 | 18.5 |
| Sartomer SR9003 | 40.0 | 40.0 | 40.0 | 40.0 | 40.0 | 40.0 |
| COINI-21 | 5.0 | 10.0 | — | — | — | — |
| COINI-22 | — | — | 5.5 | 10.5 | — | — |
| COMPCOINI-01 | — | — | — | — | 5.0 | 10.5 |
| Genocure EPD | — | — | — | — | 4.0 | 7.5 |
| Cyan dispersion II | 13.5 | 13.5 | 13.5 | 13.5 | 13.5 | 13.5 |
| Genocure ITX | 5.0 | 5.0 | 5.0 | 5.0 | 5.0 | 5.0 |
| 50% Genorad 16 in DPGDA | 2.0 | 2.0 | 2.0 | 2.0 | 2.0 | 2.0 |
| BYK333 | 3.0 | 3.0 | 3.0 | 3.0 | 3.0 | 3.0 |

The UV curable inkjet ink compositions INV-13 to INV-16 and COMP-05 and COMP-06 were coated on an unsubbed 100 μm PET substrate, using a bar coater and a 10 μm wired bar. Each coated layer was cured on a Fusion DRSE-120 conveyer, equipped with a Fusion VPS/I600 lamp (D-bulb), which transported the samples under the UV-lamp on a conveyer belt at a speed of 20 m/min. The curing speed and viscosity are summarized in Table 11.

TABLE 11

| Radiation curable composition | Viscosity (mPa·s) | Curing speed |
|---|---|---|
| INV-13 | 29 | 65 |
| INV-14 | 30 | 40 |
| INV-15 | 49 | 55 |
| INV-16 | 62 | 40 |
| COMP-05 | 22 | 60 |
| COMP-06 | 22 | >200 |

From Table 11 it is clear that for the inventive inkjet ink compositions (INV-13 to IN-16), the curing speed is less dependent on the concentration of the co-initiator compared to the comparative inkjet ink compositions (COMP-05 and COMP-06), the latter comprising a mixture of an aromatic and an aliphatic co-initiator.

We claim:

1. A radiation curable composition comprising a curable compound, a photo-initiator and a co-initiator, wherein said co-initiator has a structure according to Formula III

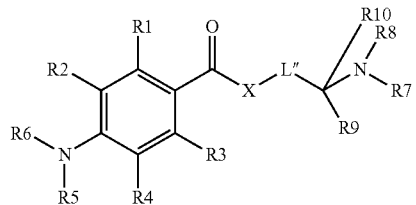

Formula III wherein
L" represents a divalent linking group positioning the nitrogen atom of the aromatic amine and the nitrogen of the aliphatic amine in a 1-10 to 1-23 position;
R1, R2, R3 and R4 independently represent a hydrogen or a substituent;
R5 and R6 independently represent an optionally substituted alkyl group, an optionally substituted alkenyl group, an optionally substituted alkynyl group, an optionally substituted (hetero)aralkyl group, an optionally substituted cycloalkyl group or an optionally substituted (hetero)aryl group;
R7 and R8 independently represent an optionally substituted alkyl group, an optionally substituted alkenyl group, an optionally substituted alkynyl group, an optionally substituted (hetero)aralkyl group or an optionally substituted cycloalkyl group;
X represents O, S or NR11 wherein R11 represents a hydrogen, an optionally substituted alkyl group, an optionally substituted alkenyl group, an optionally substituted alkynyl group, an optionally substituted (hetero)aralkyl group, an optionally substituted cycloalkyl group or an optionally substituted (hetero)aryl group;
R9 and R10 independently represent a hydrogen, an optionally substituted alkyl group, an optionally substituted alkenyl group, an optionally substituted alkynyl group, an optionally substituted (hetero)aralkyl group, an optionally substituted cycloalkyl group or an optionally substituted (hetero)aryl group;
R6 and R5, R1 and R2, R3 and R4 may represent the necessary atoms to form a ring;
any combinations of two groups selected from R7 to R10 or from R5, R6, R2 and R4 may represent the necessary atoms to form a ring;
any of R7 to R10 may represent the necessary atoms to form a ring with one of the atoms of L";
R11 and R1, R11 and R3 may represent the necessary atoms to form a ring;
R11 may represent the necessary atoms to form a ring with one of the atoms of L";
R11 and any of R7 to R10 may represent the necessary atom to form a ring;
with the proviso that both the aromatic and aliphatic tertiary amine each have at least one alfa-hydrogen.

2. A radiation curable composition comprising a curable compound, a photo-initiator and a co-initiator, wherein said co-initiator has a structure according to Formula IV Formula IV wherein
L" represents a divalent linking group positioning the nitrogen atom of the aromatic amine and the nitrogen of the aliphatic amine in a 1-10 to 1-23 position;
R12, R13, R14 and R15 independently represent an optionally substituted alkyl group;
R16 and R17 independently represent a hydrogen or an optionally substituted alkyl group;
R12 and R13 may represent the necessary atoms to form a ring;
any two groups selected from R14 to R17 may represent the necessary atoms to form a ring;
any of R14 to R17 may represent the necessary atoms to form a ring with an atom of L";
with the proviso that both the aromatic and aliphatic tertiary amine each have at least one alfa-hydrogen.

3. A radiation curable composition comprising a curable compound, a photo-initiator and a co-initiator, wherein said co-initiator has a structure according to Formula V

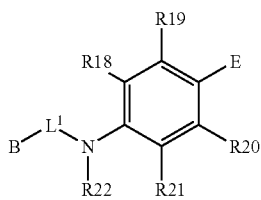

Formula V wherein
B represents a structural moiety comprising at least one aliphatic tertiary amine;
E represents an electron withdrawing group selected from the group consisting of an aldehyde, a ketone, an ester and an amide;
R18 to R21 independently represent a hydrogen or a substituent;
R22 represents an optionally substituted alkyl group, an optionally substituted alkenyl group, an optionally substituted alkynyl group, an optionally substituted (hetero) aralkyl group or an optionally substituted (hetero)aryl group;
$L^1$ represents a divalent linking group positioning the nitrogen atom of the aromatic amine and the nitrogen of the at least one aliphatic amine of the structural moiety B in a 1-3 to 1-13 position;
R18 and R19 may represent the necessary atoms to form a 5 to 7 membered ring;
R21 and R20 may represent the necessary atoms to form a 5 to 7 membered ring;
R22 with any of R18 and R21 may represent the necessary atoms form a 5 to 7 membered ring;
any of R19 and R20 together with E may represent the necessary atoms to form a 5 to 7 membered ring;
R22 with an atom of B or $L^1$ may represent the necessary atoms to form a 5 to 7 membered ring;
any of R18, R19 and R21 may represent the necessary atoms to form a ring with an atom of B;
an atom of B may form a 5 to 7 membered ring with an atom of $L^1$;
with the proviso that at least one aromatic and at least one aliphatic amine each have at least one alfa-hydrogen.

4. The radiation curable composition according to claim 1, wherein said photo-initiator is a Type I photo-initiator.

5. The radiation curable composition according to claim 2, wherein said photo-initiator is a Type I photo-initiator.

6. The radiation curable composition according to claim 3, wherein said photo-initiator is a Type I photo-initiator.

7. The radiation curable composition according to claim 4, wherein said Type I photo-initiator is an acyl phosphine oxide or bisacyl phosphine oxide.

8. The radiation curable composition according to claim 5, wherein said Type I photo-initiator is an acyl phosphine oxide or bisacyl phosphine oxide.

9. The radiation curable composition according to claim 6, wherein said Type I photo-initiator is an acyl phosphine oxide or bisacyl phosphine oxide.

10. The radiation curable composition according to claim 1, wherein said radiation curable composition comprises a Type II photo-initiator.

11. The radiation curable composition according to claim 2, wherein said radiation curable composition comprises a Type II photo-initiator.

12. The radiation curable composition according to claim 6, wherein said radiation curable composition further comprises a Type II photo-initiator.

13. The radiation curable composition according to claim 9, wherein said radiation curable composition further comprises a Type II photo-initiator.

14. The radiation curable composition according to claim 1, wherein said composition is a coating composition.

15. The radiation curable composition according to claim 14, wherein said coating composition is a varnish, primer or lacquer.

16. The radiation curable composition according to claim 1, wherein said composition is a radiation curable inkjet ink.

17. The radiation curable composition according to claim 2, wherein said composition is a radiation curable inkjet ink.

18. The radiation curable composition according to claim 3, wherein said composition is a radiation curable inkjet ink.

19. The radiation curable composition according to claim 16, wherein said composition is a UV curable inkjet ink.

20. The radiation curable composition according to claim 17, wherein said composition is a UV curable inkjet ink.

21. The radiation curable composition according to claim 18, wherein said composition is a UV curable inkjet ink.

22. The radiation curable composition according to claim 2, wherein said composition is a coating composition.

23. The radiation curable composition according to claim 22, wherein said coating composition is a varnish, primer or lacquer.

24. The radiation curable composition according to claim 3, wherein said composition is a coating composition.

25. The radiation curable composition according to claim 24, wherein said coating composition is a varnish, primer or lacquer.

26. The radiation curable composition according to claim 3, wherein said radiation curable composition comprises a Type II photo-initiator.

27. The radiation curable composition according to claim 4, wherein said radiation curable composition further comprises a Type II photo-initiator.

28. The radiation curable composition according to claim 5, wherein said radiation curable composition further comprises a Type II photo-initiator.

* * * * *